(12) United States Patent
Butzmann

(10) Patent No.: US 9,537,132 B2
(45) Date of Patent: Jan. 3, 2017

(54) BATTERY HAVING A PLURALITY OF BATTERY MODULES ARRANGED IN BATTERY STRINGS, AND METHOD FOR OPERATING THE BATTERY

(71) Applicants: Robert Bosch GmbH, Stuttgart (DE); Samsung SDI Co., Ltd., Yongin-si, Gyeonggi-do (KR)

(72) Inventor: Stefan Butzmann, Beilstein (DE)

(73) Assignees: Robert Bosch GmbH, Stuttgart (DE); Samsung SDI Co., Ltd., Yongin-si, Gyeonggi-do (KR)

(*) Notice: Subject to any disclaimer, the term of this patent is extended or adjusted under 35 U.S.C. 154(b) by 701 days.

(21) Appl. No.: 13/889,596

(22) Filed: May 8, 2013

(65) Prior Publication Data
US 2013/0300369 A1 Nov. 14, 2013

(30) Foreign Application Priority Data
May 9, 2012 (DE) .......... 10 2012 207 671

(51) Int. Cl.
*H02J 7/00* (2006.01)
*H01M 2/20* (2006.01)
*H02J 7/02* (2016.01)
*H01M 10/44* (2006.01)
(Continued)

(52) U.S. Cl.
CPC ............ *H01M 2/20* (2013.01); *B60L 11/1805* (2013.01); *B60L 11/1853* (2013.01); *B60L 11/1866* (2013.01); *H01M 2/206* (2013.01); *H01M 10/441* (2013.01); *H02J 7/0018* (2013.01); *H02J 7/0019* (2013.01); *H02J 7/022* (2013.01); *B60L 2210/10* (2013.01); *B60L 2240/547* (2013.01); *H01M 2010/4271* (2013.01); *H01M 2220/20* (2013.01); *H02J 7/0065* (2013.01); *H02J 2007/0059* (2013.01); *Y02T 10/7005* (2013.01); *Y02T 10/7011* (2013.01);
(Continued)

(58) Field of Classification Search
CPC ...... H02J 7/0013; H02J 7/0014; H02J 7/0016; H02J 7/0018; H02J 7/0019; H02J 7/0054; H02J 7/022; H02J 7/34
USPC ......................................... 320/126, 120–122
See application file for complete search history.

(56) References Cited

U.S. PATENT DOCUMENTS 6,265,846 B1 7/2001 Flechsig et al.
2010/0007308 A1* 1/2010 Lee .................. H02J 7/0018
320/118

(Continued)

FOREIGN PATENT DOCUMENTS

CN 1437295 A 8/2003
CN 1262058 C 6/2006
DE 10 2010 027 864 A1 12/2011

*Primary Examiner* — Richard Isla Rodas
*Assistant Examiner* — David V Henze-Gongola
(74) *Attorney, Agent, or Firm* — Maginot, Moore & Beck LLP

(57) ABSTRACT

A battery includes a plurality of battery modules which are arranged in battery strings and are selectively activated or deactivated by driving. The battery module voltage of a respective battery module contributes to an output voltage of the corresponding battery string of the battery in the activated state. The battery further includes a switching converter topology which is coupled to the battery strings and is configured to selectively generate currents flowing into one or more of the battery strings.

7 Claims, 4 Drawing Sheets

(51) Int. Cl.
 *B60L 11/18* (2006.01)
 *H01M 10/42* (2006.01)
(52) U.S. Cl.
 CPC ........ *Y02T 10/7055* (2013.01); *Y02T 10/7061* (2013.01); *Y02T 10/7216* (2013.01)

(56) References Cited

U.S. PATENT DOCUMENTS

2011/0057617 A1*  3/2011  Finberg ................. H02J 7/0016
                                                       320/118
2013/0221926 A1*  8/2013  Furtner .................... G06F 1/263
                                                       320/129

* cited by examiner

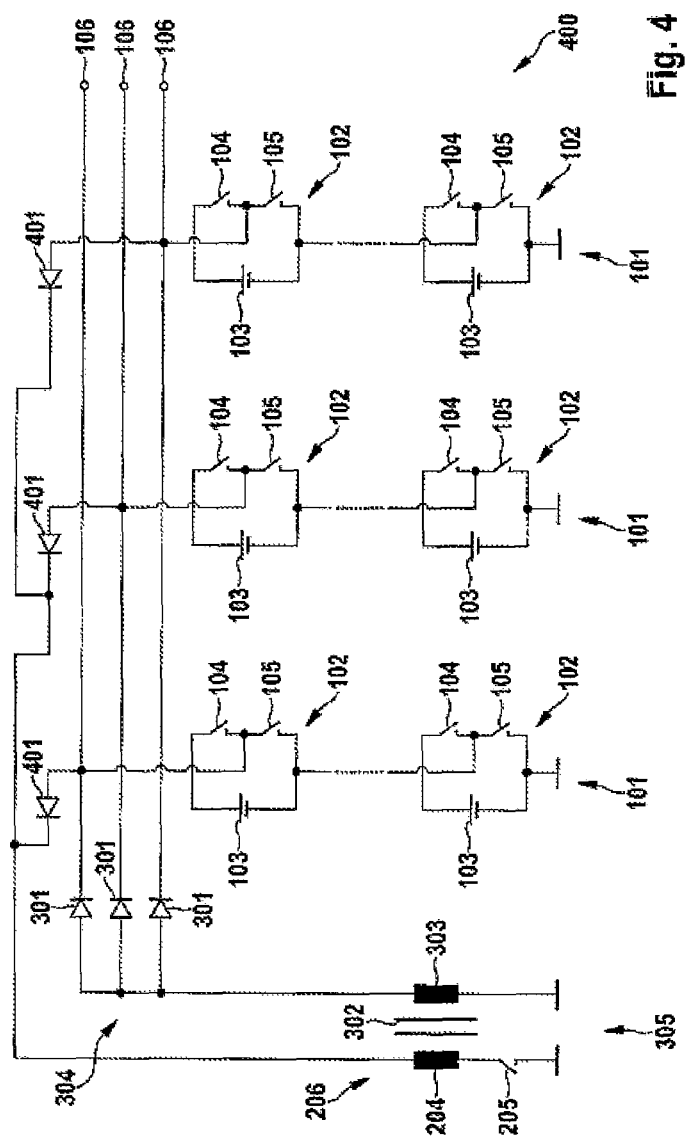

BATTERY HAVING A PLURALITY OF BATTERY MODULES ARRANGED IN BATTERY STRINGS, AND METHOD FOR OPERATING THE BATTERY

This application claims priority under 35 U.S.C. §119 to patent application no. DE 10 2012 207 671.9, filed on May 9, 2012 in Germany, the disclosure of which is incorporated herein by reference in its entirety.

BACKGROUND

The present disclosure relates to a battery having a plurality of battery modules which are arranged in battery strings and can be selectively activated or deactivated by means of driving, the battery module voltage of a respective battery module contributing to an output voltage of the corresponding battery string of the battery in the activated state. The disclosure also relates to an associated method for operating the battery. In addition, the disclosure relates to a vehicle having the battery.

It is becoming apparent that new batteries, on which very high demands with regard to reliability, safety, performance and service life will be imposed, will be increasingly used in future in stationary applications, for example wind power installations, in vehicles, for example hybrid and electric vehicles, and in the consumer sector, for example in laptops and mobile telephones. Batteries having lithium ion technology, in particular, are suitable for such tasks. They are distinguished, inter alia, by a high energy density and an extremely low self-discharge.

Previous disclosures by the applicant presented methods concerning how a lithium ion battery can be expediently subdivided into modules which are then connected to form individual strings which then directly drive an electric motor. An example of a modular battery is disclosed in the document DE 10 2010 027 864 A1. The corresponding principle is explained in more detail by way of example below using FIG. 1.

According to FIG. 1, a battery 100 has a plurality of battery strings 101 with battery modules 102. Each battery module 102 has one or more battery cells 103, only one battery cell 103 of which is illustrated in the drawing for each battery module 102. Each battery module 102 also respectively has two switches 104, 105, a respective battery module 102 being able to be activated or deactivated depending on the switching position of the switches 104, 105. In the activated state, the battery module voltage of the respective connected or activated battery module 102 contributes to an output voltage of the corresponding battery string 101, which output voltage is then available at a connection 106. In contrast, in the deactivated state, the battery module 102 is decoupled from the battery string 101 and is bridged in an electrically conductive manner.

An advantage of the arrangement according to FIG. 1 is that a battery voltage can thus be set in a variable manner. For example, with sufficiently fine division of the battery strings 101 into a multiplicity of battery modules 102 and with appropriate driving, a sinusoidal profile of the battery voltage can be set at the terminals 106, which profile has a phase shift. This makes it possible to drive a (three-phase) electric motor 107, even without the need for a special interposed inverter.

Previous disclosures by the applicant also presented a battery, in which the individual battery modules are connected to a DC/DC converter. FIG. 2 illustrates such an arrangement by way of example, the circuits of the battery modules 102 shown each being supplemented with a secondary subcircuit 207 of the DC/DC converter. The DC/DC converter is preferably in the form of a flyback converter. The secondary subcircuits 207 each have a diode 201 and a secondary coil 202. The primary-side subcircuit 206 of the battery 200 has a primary coil 204 and a switch 205. DC-isolation between the battery modules 202 and the primary-side subcircuit 206 can also be effected using the coil core 203. As an advantage of the circuit topology shown, it is possible, for example, to charge the battery modules 202 from the 12-V power supply system or, depending on the configuration of the DC/DC converter, from the 220-V domestic power supply system. However, the circuit topology from FIG. 2 results in a high wiring complexity and therefore high costs since each battery module 202 must be wired to a separate secondary coil 202 on the DC/DC converter. In addition, although it is possible to carry out active balancing between the battery modules 102 and individual battery strings 101 in the battery 200 during operation by connecting the individual battery modules 102 for different periods of time depending on their performance during the production of the desired AC output voltages, such a method cannot be used at a standstill or during charging, for example.

SUMMARY

The battery according to the disclosure has a plurality of battery modules which are arranged in battery strings and can be selectively activated or deactivated by means of driving. The battery module voltage of a respective battery module contributes to an output voltage of the corresponding battery string of the battery in the activated state. The battery also comprises a switching converter topology which is coupled to the battery strings and is designed to selectively generate currents flowing into one or more of the battery strings.

The method according to the disclosure in principle comprises steps in which the output voltages of battery strings are set or maintained in a suitable manner by driving the corresponding battery modules in such a manner that a predetermined selection of battery strings, which comprises one or more battery strings, is supplied with current using the switching converter topology.

Another aspect of the disclosure also discloses a motor vehicle having an electric motor and the battery according to the disclosure, the battery being arranged in a drive train of the electric motor.

An advantage of the disclosure is that it is possible to supply the battery strings with current in a flexible manner with simultaneously little wiring complexity, for example in order to charge battery modules of one or more of the battery strings or of all battery strings.

In one preferred development of the disclosure, the switching converter topology is furthermore also designed to draw current from battery strings.

The switching converter topology preferably has a flyback converter.

In one advantageous embodiment of the disclosure, the switching converter topology is integrated in the battery in such a manner that the currents flowing into one or more of the battery strings can be generated in addition to a battery current flowing at a battery terminal. This further increases the flexibility.

It is also preferred for the individual battery strings to be connected to one another by means of an arrangement having diodes. This advantageous embodiment makes it possible, for example, in a particularly simple manner to deliver the energy stored in a core of the switching converter topology, which is in the form of a flyback converter for example, only to that battery string which has the lowest voltage.

In one particularly favorable embodiment, at least one diode is respectively arranged, for each battery string, between a secondary coil of the switching converter topology and a connection of the respective battery string.

In one development of the method according to the disclosure, the battery string which is intended to be charged is deliberately selected. The other battery strings, that is to say the two other battery strings in the case of a total of three battery strings, are set to a higher output voltage in this case by activating all battery modules in the other battery strings. At the same time, one or more of the battery modules are deactivated or decoupled or bridged in the battery string to be charged.

It is also preferred for at least one diode to be respectively arranged, for each battery string, between a primary coil of the switching converter topology and a connection of the respective battery string. This advantageously makes it possible, in a simple manner, to draw energy from one battery string and to transmit it to another battery string.

In one particularly favorable embodiment of the disclosure, the switching converter topology, for each battery string of the battery, is respectively connected to the same connection of the respective battery string on the primary side and on the secondary side.

The method according to the disclosure can advantageously have steps in which the predetermined battery strings are charged using the switching converter topology, and/or the output voltages of battery strings are set or maintained in such a manner that the battery modules are balanced using the switching converter topology, the primary side of the switching converter topology being supplied using one or more such battery strings which are currently not supplied with current.

The disclosure can therefore be configured in such a manner that energy can be drawn from one battery string and can be transmitted to another battery string. In order to make this possible, the three battery strings, for example, are connected to one another via the abovementioned diode arrangement, with the result that the voltage associated with the battery string with the highest output voltage is always applied to the primary side of the switching converter topology. Since the secondary side can likewise be connected to the battery strings via diodes, it is thus possible to always transmit energy stored in the core to the battery string with the lowest output voltage during conversion. It can therefore be ensured that the energy can be transmitted from the battery string with the highest output voltage to the battery string with the lowest output voltage.

According to the disclosure, the output voltage of the battery strings can therefore be selected by deliberately switching on and bridging individual battery modules in such a manner that energy flows in the desired direction.

The switching converter topology preferably has DC-isolation. DC-isolation between the primary side and the secondary side of the switching converter topology can therefore be favorably achieved. In particular, the battery modules can be electrically decoupled from the primary side in this manner.

In one embodiment, the primary side may also be coupled to a power factor correction stage.

The disclosure can be used, in particular, in such battery modules comprising two switches which are each arranged in such a manner that a respective battery module is activated in a first switching position of the switches and the respective battery module is deactivated in a second switching position of the switches.

The battery is preferably a lithium ion battery.

Advantageous developments of the disclosure are stated in the subclaims and are described in the description.

BRIEF DESCRIPTION OF THE DRAWINGS

Exemplary embodiments of the disclosure are explained in more detail using the drawings and the following description. In the drawings:

FIG. 4 shows a battery with an integrated switching converter topology according to a second exemplary embodiment of the disclosure.

DETAILED DESCRIPTION

Figure 1:
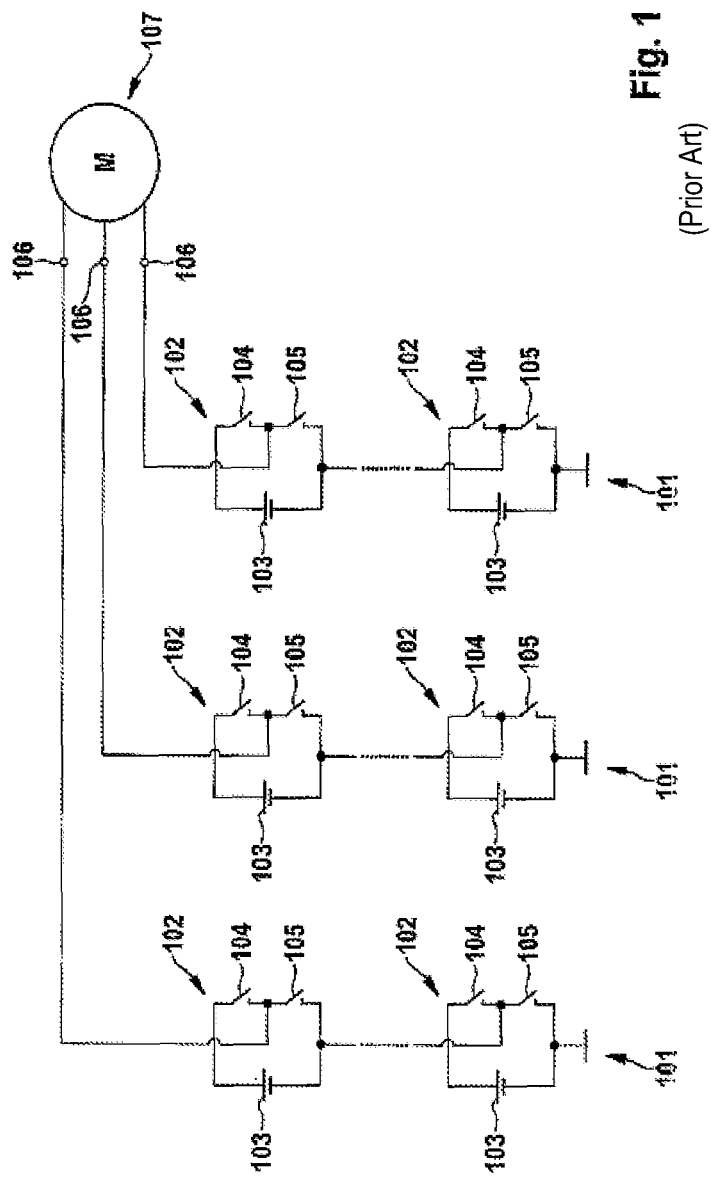
FIG. 1 shows a battery having three battery strings which have selectively activatable and deactivatable battery modules and are coupled to the connections of a three-phase electric motor, according to the prior art.
Figure 2:
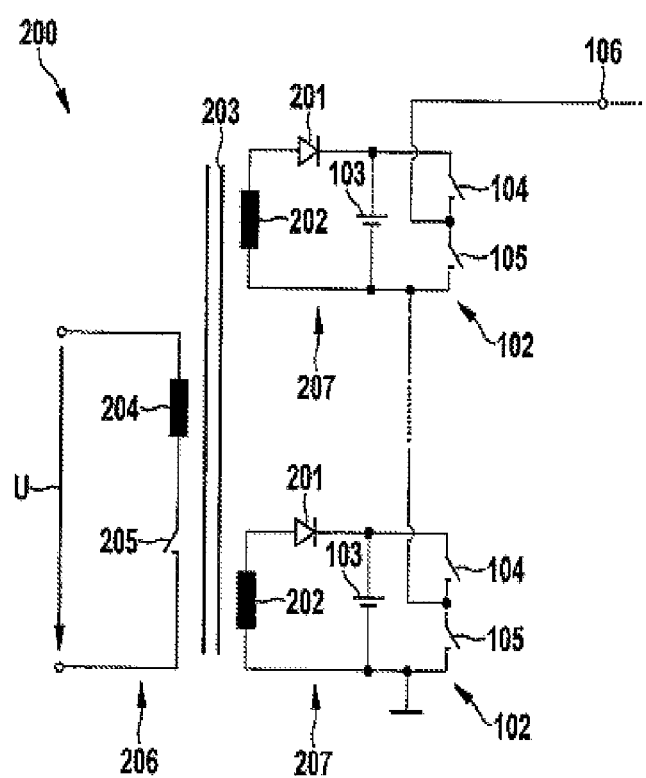
FIG. 2 shows a battery with an integrated switching converter topology in which each battery module of a battery string is provided with a secondary circuit of the switching converter topology.
Figure 3:
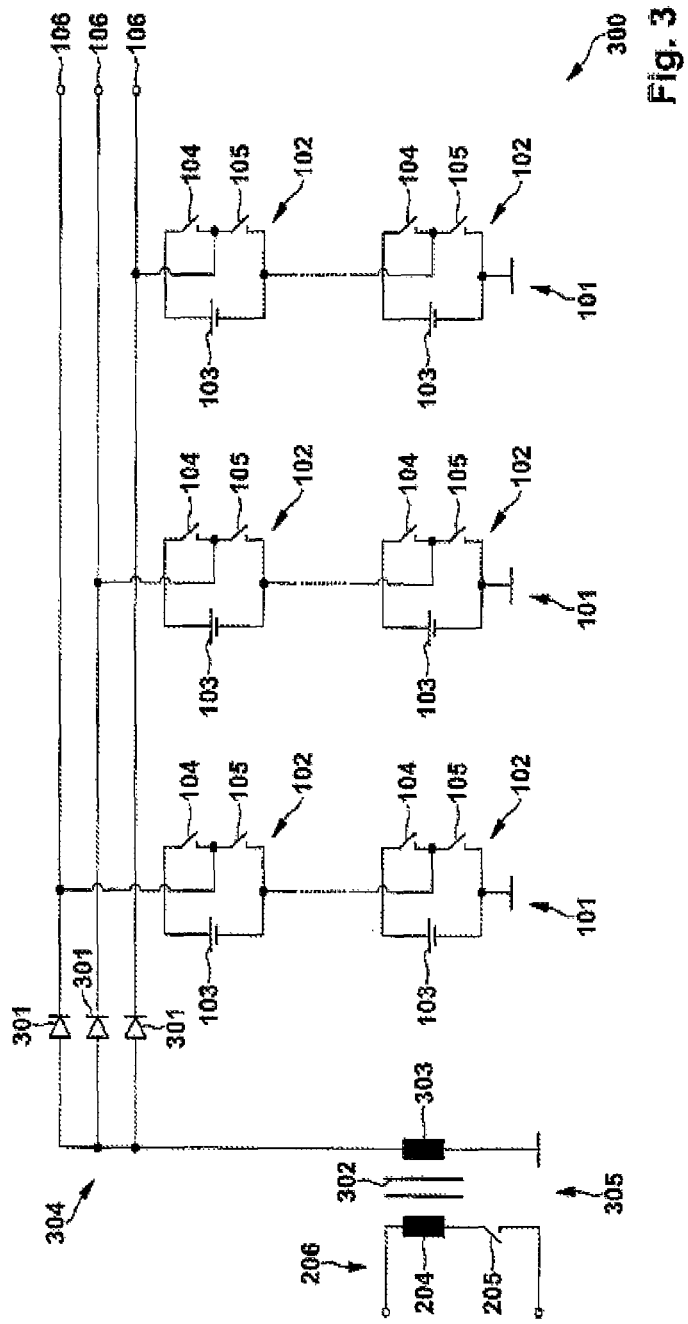
FIG. 3 shows a battery with an integrated switching converter topology according to a first exemplary embodiment of the disclosure.

FIG. 3 illustrates a battery 300 with an integrated switching converter topology 305 according to a first embodiment of the disclosure. As shown in FIG. 3, a principle of supplying battery modules 103 using a switching converter topology 305 is applied to the individual battery strings 101, rather than to each individual module of the battery modules 102. The positive outputs of the battery strings 101 are each connected to a secondary side 304 of the switching converter topology. The switching converter topology 305 is preferably in the form of a flyback converter and, to state it clearly, is also subdivided into three on the secondary side according to the three battery strings 101, even though the secondary coil 303 is present only once. However, a diode 301 is respectively present for each battery string 101, which diode is used as the output diode of the switching converter topology 305 and is forward-biased in the direction of the respective battery string 101. The outputs of the battery strings 101, which are each coupled to the switching converter topology 305, are also each connected to one of the three terminal connections 106 of the battery 300. The primary side 206 of the switching converter topology 305 has a primary coil 204 and a switch 205 and can be supplied with energy from the outside by means of connections, which energy is transmitted to the secondary side 303 via the DC-isolation 302. On account of the arrangement of the diodes 301, this energy is delivered only to that battery string 101 which has the lowest voltage. In one particularly advantageous variant of this embodiment, the battery string 101 which is currently intended to be charged is deliberately selected by setting the two other battery strings 101 to a comparatively higher output voltage. This can be effected by switching on all battery modules 102 of the other battery strings 101, the battery string 101 to be charged being set to a lower output voltage, for example by deactivating a battery module 102.

FIG. 4 illustrates a battery 400 according to a second embodiment of the disclosure which comprises a switching converter topology 305. According to the arrangement shown in FIG. 4, the switching converter topology 305 or a DC/DC converter is used in such a manner that it can draw energy from one battery string 101 and can transmit it to another battery string 101. In order to make this possible, the three battery strings 101 are connected to one another via a circuit arrangement having diodes 401, with the result that the voltage associated with the battery string with the highest output voltage is always applied to the primary side 206 of the switching converter topology 305. Furthermore, the secondary side 304 is likewise connected to the three battery strings 101 via diodes 301, the energy stored in the core of the switching converter topology 305 always being transmitted to the battery string 101 with the lowest output voltage during conversion. This advantageously makes it possible to ensure that the energy is transmitted from the battery string 101 with the highest output voltage to the battery string 101 with the lowest output voltage.

In an advantageous method for operating the battery 400, the output voltage of the battery strings 101 is selected by deliberately switching on and bridging individual battery modules 102 in such a manner that the energy flows in the desired direction.

What is claimed is:

1. A battery comprising:
   a plurality of battery strings, each battery string of the plurality of battery strings including a first terminal, a second terminal, and a plurality of battery modules connected in series between the first terminal and the second terminal, the second terminal of each battery string of the plurality of battery strings being connected to a common ground, the first terminal of each battery string of the plurality being connected to a first node via a respective first diode configured to allow current to flow only from the first node to the first terminal, each battery module of the plurality of battery modules being configured to be selectively connected and disconnected from the respective battery string such that each battery module only contributes to an output voltage of the respective battery string when connected; and
   a switching converter topology having a primary side that is coupled to a secondary side, the secondary side being connected to the first node and configured to selectively generate currents that flow into the first terminal of each of the battery strings of the plurality of battery strings via the respective first diodes.

2. The battery according to claim 1, wherein the switching converter topology is integrated in the battery such that the currents that selectively flow into the first terminal of each of the battery strings of the plurality of battery strings are generated in addition to a battery current flowing at a terminal of the battery.

3. The battery according to claim 1, wherein the first terminal of each battery string of the plurality of battery strings is connected to a second node via a respective second diode configured to allow current to flow only from the second terminal to the second node, the primary side of the switching converter topology being connected to the second node.

4. The battery according to claim 1, wherein the switching converter topology includes a flyback converter.

5. A method for operating a battery including a plurality of battery strings, each battery string of the plurality of battery strings including a first terminal, a second terminal, and a plurality of battery modules connected in series between the first terminal and the second terminal, the second terminal of each battery string of the plurality of battery strings being connected to a common ground, the first terminal of each battery string of the plurality being connected to a first node via a respective first diode configured to allow current to flow only from the first node to the first terminal, each battery module of the plurality of battery modules being configured to be selectively connected and disconnected from the respective battery string such that each battery module only contributes to an output voltage of the respective battery string when connected, the method comprising:
   maintaining output voltages of the battery strings of the plurality of battery strings by supplying current to a predetermined selection of the battery strings using a switching converter topology, the predetermined selection of the battery strings including at least one of the battery strings of the plurality of battery strings,
   wherein the switching converter topology has a primary side that is coupled to a secondary side, the secondary side being connected to the first node and configured to selectively generate currents that flow into the first terminal of each of the battery strings of the plurality of battery strings via the respective first diodes.

6. The method according to claim 5, further comprising:
   charging the predetermined selection of the battery strings using the switching converter topology; and
   maintaining the output voltages of the battery strings of the plurality of battery strings such that the battery modules of the plurality of battery modules are balanced using the switching converter topology,
   wherein a primary side of the switching converter topology is supplied using one or more of the battery strings that are currently not supplied with current.

7. A motor vehicle comprising:
   an electric motor; and
   a battery including (i) a plurality of battery strings, each battery string of the plurality of battery strings including a first terminal, a second terminal, and a plurality of battery modules connected in series between the first terminal and the second terminal, the second terminal of each battery string of the plurality of battery strings being connected to a common ground, the first terminal of each battery string of the plurality being connected to a first node via a respective first diode configured to allow current to flow only from the first node to the first terminal, each battery module of the plurality of battery modules being configured to be selectively connected and disconnected from the respective battery string such that each battery module only contributes to an output voltage of the respective battery string when connected, and (ii) a switching converter topology having a primary side that is coupled to a secondary side, the secondary side being connected to the first node and configured to selectively generate currents that flow into the first terminal of each of the battery strings of the plurality of battery strings via the respective first diodes,
   wherein the battery is arranged in a drive train of the electric motor.

* * * * *